(12) United States Patent
Takaki (10) Patent No.: US 10,803,327 B2
(45) Date of Patent: Oct. 13, 2020

(54) OBJECT DETECTION APPARATUS

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 95 days.

(21) Appl. No.: 16/077,231

(22) PCT Filed: Jan. 20, 2017

(86) PCT No.: PCT/JP2017/001988
§ 371 (c)(1),
(2) Date: Aug. 10, 2018

(87) PCT Pub. No.: WO2017/138331
PCT Pub. Date: Aug. 17, 2017

(65) Prior Publication Data
US 2019/0050650 A1  Feb. 14, 2019

(30) Foreign Application Priority Data

Feb. 11, 2016   (JP) ................................. 2016-024225

(51) Int. Cl.
| | |
|---|---|
| *G06K 9/00* | (2006.01) |
| *B60W 30/095* | (2012.01) |
| *G06T 7/62* | (2017.01) |
| *G06T 7/73* | (2017.01) |

(Continued)

(52) U.S. Cl.
CPC ..... *G06K 9/00805* (2013.01); *B60W 30/0956* (2013.01); *G06T 7/60* (2013.01); *G06T 7/62* (2017.01); *G06T 7/73* (2017.01); *G08G 1/166* (2013.01); *G06T 2207/10048* (2013.01);

(Continued)

(58) Field of Classification Search
None
See application file for complete search history.

(56) References Cited

U.S. PATENT DOCUMENTS

| | | | | |
|---|---|---|---|---|
| 2009/0184845 A1* | 7/2009 | Saito | .................. | G06K 9/00805 340/937 |
| 2014/0254872 A1* | 9/2014 | Guan | .................. | G06K 9/00624 382/103 |
| 2015/0310286 A1* | 10/2015 | Nakanishi | .......... | G06K 9/00825 382/104 |

FOREIGN PATENT DOCUMENTS

| | | |
|---|---|---|
| JP | 2006-240454 A | 9/2006 |
| JP | 2009-175846 A | 8/2009 |
| JP | 2014-197378 A | 10/2014 |

* cited by examiner

*Primary Examiner* — Leon Viet Q Nguyen
(74) *Attorney, Agent, or Firm* — Maschoff Brennan (57) ABSTRACT

An ECU detects an object which is present in a surrounding area based on an image captured by an imaging unit. In particular, the ECU includes: a lateral width calculation section which calculates, as an image lateral width, a size of the object in a lateral direction relative to an imaging axis direction of the imaging unit based on the image and dictionary information for object identification prepared in advance; a maximum value determination section which determines whether a current value of the image lateral width calculated by the lateral width calculation section is a maximum value in comparison to a calculation history of the image lateral width; and a lateral width update section which updates an object width which is a lateral width of the object by setting, as the object width, the image lateral width having the maximum value in the calculation history.

8 Claims, 3 Drawing Sheets

(51) Int. Cl.
 *G08G 1/16* (2006.01)
 *G06T 7/60* (2017.01)
(52) U.S. Cl.
 CPC ............... *G06T 2207/20061* (2013.01); *G06T 2207/30248* (2013.01)

OBJECT DETECTION APPARATUS

CROSS-REFERENCE TO RELATED APPLICATIONS

This application is based on Japanese Patent Application No. 2016-024225 filed on Feb. 11, 2016, the description of which is incorporated herein by reference.

TECHNICAL FIELD

The present disclosure relates to an object detection apparatus which detects an object which is present in a surrounding area on the basis of an image captured by an imaging means.

BACKGROUND ART

A technique has conventionally been proposed in which a camera is mounted on a vehicle to detect an object (obstacle) such as another vehicle or an aboveground structure which is present around the vehicle and perform, on the basis of the result of the detection of the object, various types of control for improving driving safety of the vehicle, that is, for example, control such as activation of a brake unit or issuance of alarm to the driver.

For example, Patent Literature 1 describes the following configuration in which a distance measuring radar and a camera are provided in a vehicle. On the basis of the result of measurement by the distance measuring radar, a lateral width of an object outside the vehicle is calculated as a radar width. On the basis of the result of image capturing by the camera, the lateral width of the object outside the vehicle is calculated as an image width. A smaller one of the radar width and the image width is recognized as the lateral width of the object outside the vehicle, and on the basis of the recognized lateral width, a probability of a collision is determined, and an alarm is issued. According to the above configuration in which the smaller one of the radar width and the image width is recognized as the lateral width of the object outside the vehicle, it is possible to prevent a problem in which the object outside the vehicle is erroneously recognized to have a width greater than the actual width of the object, and the erroneous recognition causes, for example, unnecessary issuance of an alarm.

CITATION LIST

Patent Literature

[PTL 1] JP 2006-240454 A

SUMMARY OF THE INVENTION

When an object is detected on the basis of a camera image, dictionary information for object identification which is prepared in advance is used to compare the image of the object with the dictionary information. A type, size, or the like of the object is recognized on the basis of the result of the comparison. For example, when a front vehicle which is traveling ahead of the own vehicle is detected, dictionary information defining a pattern of the rear of a vehicle is used to obtain a lateral width of the front vehicle on the basis of an image of the rear of the front vehicle and the dictionary information regarding the rear of the vehicle.

When an object is detected by using the camera image and the dictionary information, however, a lateral width of the object may be erroneously obtained to be smaller than the actual lateral width of the object. For example, when the rear of the front vehicle is recognized, a part which is not actually an end at the rear of the vehicle may be erroneously recognized as the end due to, for example, various shapes such as an uneven structure or a lamp pattern which is actually present at the rear of the vehicle, and this may cause erroneous calculation in which a lateral width of the vehicle is erroneously calculated to be smaller than the actual lateral width of the vehicle. In such a case, it may be determined that a probability of a collision with the object is low, and this may cause delay or failure in activation of an alarm, automatic braking, or the like.

The present disclosure has been made in view of the above circumstances, and a main object of the present disclosure is to provide an object detection apparatus which is capable of properly recognizing a lateral width of an object.

The present disclosure is an object detection apparatus which detects an object which is present in a surrounding area on the basis of an image captured by an imaging means. The object detection apparatus includes: a lateral width calculation section which calculates, as an image lateral width, a size of the object in a lateral direction relative to an imaging axis direction of the imaging means on the basis of the image and dictionary information which is prepared in advance and is used for object identification; a maximum value determination section which determines whether a current value of the image lateral width calculated by the lateral width calculation section is a maximum value in comparison to a calculation history of the image lateral width; and a lateral width update section which updates an object width which is a lateral width of the object by setting, as the object width, the image lateral width having the maximum value in the calculation history.

When a lateral width of the object is calculated on the basis of the image captured by the imaging means such as a camera and the dictionary information, the lateral width of the object may be erroneously calculated to be smaller than the actual lateral width of the object, depending on factors such as a shape, design, or attachment on the exterior surface of the object. In this regard, according to the above configuration, when the image lateral width is calculated on the basis of the captured image and the dictionary information, it is determined whether the current value of the image lateral width is the maximum value in comparison to the calculation history of the image lateral width, and the object width is updated by setting, as the object width, the maximum value in the calculation history of the image lateral width. In this case, since the object width is updated by setting, as the object width, the maximum value in the calculation history of the image lateral width, even when the image lateral width of the object is erroneously calculated to be smaller than the actual lateral width of the object, erroneous recognition in which the calculated value is directly recognized as the object width is suppressed. This makes it possible to properly recognize the lateral width of the object.

BRIEF DESCRIPTION OF THE DRAWINGS

The above object and other objects, features, and advantages of the present disclosure will be clarified by the following detailed description with reference to the accompanying drawings, wherein.

DESCRIPTION OF THE EMBODIMENTS

The following will describe an embodiment with reference to the drawings. An ECU for object detection according to the present embodiment is mounted on an own vehicle, detects an object such as a vehicle which is present ahead of the own vehicle, and functions as a PCS system (pre-crash safety) which performs various types of control in order to avoid a collision with the object or reduce collision damage.

Figure 1:
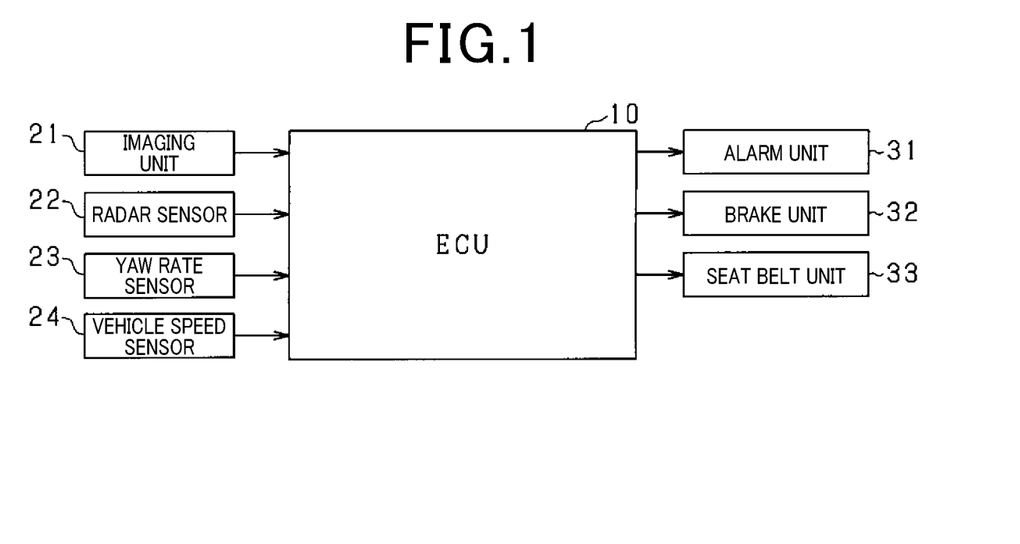
FIG. 1 is a view showing a schematic structure of a PCS system.

In FIG. 1, the PCS system includes an ECU 10, an imaging unit 21, a radar sensor 22, a yaw rate sensor 23, a vehicle speed sensor 24, an alarm unit 31, a brake unit 32, a seat belt unit 33, and the like.

The imaging unit 21 is configured by, for example, a CCD camera, a CMOS image sensor, a near infrared camera, or the like. In this case, the imaging unit 21 is mounted at a predetermined height at the center in the vehicle width direction of the own vehicle. This allows the imaging apparatus 21 to capture, from a bird's-eye view, an image of a region extending over a predetermined angular range toward an area ahead of the own vehicle. On the basis of the captured image, the imaging apparatus 21 extracts a characteristic point indicating the presence of an object. Specifically, the imaging unit 21 extracts an edge point on the basis of information on luminance of the captured image and performs a Hough Transform on the extracted edge point. In the Hough Transform, for example, a point on a straight line on which a plurality of edge points are continuously arranged or a point at which straight lines intersect with each other is extracted as a feature point. At predetermined intervals, the imaging unit 21 captures an image and extracts a feature point, and then transmits the result of the extraction of the feature point to the ECU 10. The imaging unit 21 may be a monocular camera or a stereo camera.

The radar sensor 22 detects an object ahead of the own vehicle by using directional electromagnetic waves such as millimeter waves or a laser. The radar sensor 22 is mounted at the front of the own vehicle such that an optical axis of the radar sensor 22 is directed toward the area ahead of the vehicle. At predetermined time intervals, the radar sensor 22 scans a region extending over a predetermined range toward the area ahead of the own vehicle by using a radar signal and receives electromagnetic waves reflected by a surface of a front object. By doing this, the radar sensor 22 acquires, as object information, information such as a distance to the front object and a relative speed to the front object. The acquired object information is inputted to the ECU 10.

The yaw rate sensor 23 detects a turning angular velocity (yaw rate) of the vehicle. The vehicle speed sensor 24 detects a traveling speed of the own vehicle on the basis of a rotation speed of a wheel. Results of the detection performed by the sensors 23 and 24 are inputted to the ECU 10.

The alarm unit 31, the brake unit 32, and the seat belt unit 33 each function as a safety unit which is driven by a control command from the ECU 10. Among these units, the alarm unit 31 is a loudspeaker or a display which is provided in the interior of the own vehicle. When a probability of a collision with the front object has increased, the alarm unit 31 outputs an alarm sound, an alarm message, or the like to notify the driver that there is a collision risk.

The brake unit 32 is a braking unit which performs braking of the own vehicle. The brake unit 32 is activated when a probability of a collision with the front object has increased. Specifically, for example, the brake unit 32 increases a braking force (brake assist function) for a brake operation performed by the driver or performs automatic braking (automatic brake function) when no brake operation is performed by the driver.

The seat belt unit 33 is a pretensioner which retracts a seat belt provided in each seat of the own vehicle. When a probability of a collision with the front obstacle has increased, the seat belt unit 33 takes preliminary action for retracting the seat belt. When the collision cannot be avoided, the seat belt unit 33 retracts the seat belt to remove looseness. By doing this, the seat belt unit 33 secures an occupant such as the driver in the seat to protect the occupant.

The ECU 10 is configured as an in-vehicle electronic control unit having a well-known microcomputer including a memory and performs PCS control with reference to a calculation program and control data in the memory. In this case, the ECU 10 detects a front object on the basis of an image captured by the imaging unit 21. On the basis of the result of the detection, the ECU 10 performs collision avoidance control in which at least one of the alarm unit 31, the brake unit 32, and the seat belt unit 33 is to be controlled.

Specifically, the ECU 10 acquires image data from the imaging unit 21 and determines the type of an object which is present ahead of the own vehicle on the basis of the image data and dictionary information for object identification which is prepared in advance. In this case, the dictionary information for object identification is prepared, for example, for individual types of object such as an automobile, a two-wheeled vehicle, and a pedestrian and is stored in the memory in advance. As the dictionary information for automobile, it is preferable to prepare dictionary information on at least a pattern at the front of the automobile and a pattern at the rear of the automobile. The two-wheeled vehicle is preferably separated into a bicycle and a motorcycle. The ECU 10 determines the type of the object by comparing the image data with the dictionary information and performing pattern matching. Besides the dictionary information on moving objects, the dictionary information may include dictionary information on fixed objects such as guardrails, utility poles, and road signs.

On the basis of the image data and the dictionary information, the ECU 10 calculates, as an image lateral width, a size of the object in the lateral direction relative to the imaging axis direction of the imaging unit 21 (vehicle front direction according to the present embodiment). The ECU 10 performs the collision avoidance control for the object on the basis of the lateral width of the object which is obtained from the image lateral width. In this case, the ECU 10 calculates a lap ratio which is a ratio with which the lateral width of the object overlaps the lateral width of the own vehicle in the lateral direction orthogonal to the direction of travel of the own vehicle. The ECU 10 performs the collision avoidance control by the safety unit on the basis of a probability of a collision with the object according to the lap ratio.

When the lateral width of the object is calculated on the basis of the image captured by the imaging apparatus 21 and the dictionary information, the lateral width of the object may be erroneously calculated to be smaller than the actual lateral width of the object, depending on factors such as a shape, design, or attachment on an exterior surface of the object. For example, in a case where a front vehicle which is traveling ahead of the own vehicle is to be detected, at the rear of the front vehicle, a different uneven structure or a lamp unit is provided for each vehicle model, and thus when the lateral width of the front vehicle is calculated, the lateral width may be recognized to be narrower than the actual lateral width of the front vehicle.

Figure 2:
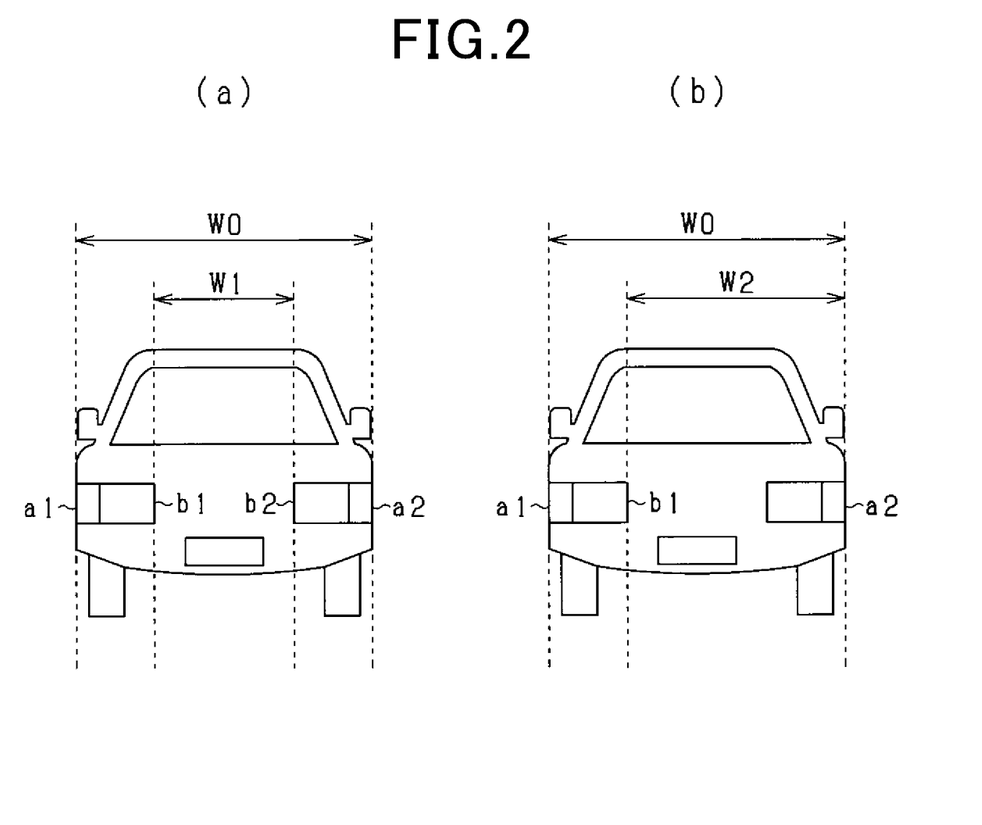
FIG. 2 is a view showing an example of a case where a lateral width of a front vehicle is erroneously calculated.

More specifically, in a vehicle shown in FIG. 2 (a) and FIG. 2 (b), an actual lateral width W0 which is the lateral width that the vehicle actually has is a distance from an end point a1 to an end point a2 at the rear of the vehicle. However, tail lamps or the like are provided to the rear of the front vehicle, and the shape or design of the tail lamps or the like may be compared to the dictionary information. That is, besides the end points a1 and a2, appearance change points b1 and b2 are present at the rear of the vehicle due to, for example, the tail lamp, and the change points b1 and b2 may be recognized as ends at the rear of the vehicle. In such a case, for example, a lateral width W1 between the change points b1 and b2 or a lateral width W2 between the change point b1 and the end point a2 is calculated as a lateral width obtained from the image, and this causes the lateral width to be recognized to be smaller than the actual lateral width. Although not illustrated in the drawings, similarly, even in a case of an object other than a vehicle, the lateral width is presumably recognized to be smaller than the actual lateral width of the object.

When the lateral width of the object is recognized to be smaller than the actual lateral width of the object as described above, even in a case where a probability of a collision with the object is high, the collision avoidance control may not be properly performed. In the present embodiment, therefore, in order to increase accuracy of recognition of the lateral width of the object, it is determined whether a current value of the image lateral width calculated on the basis of the captured image and the dictionary information is the maximum value in comparison to a calculation history of the image lateral width, and an object width which is the lateral width of the object is updated by setting, as the object width, the image lateral width having the maximum value in the calculation history. The calculation history is history information on the image lateral width which is stored for a single object in the memory, when the image lateral width is calculated at predetermined intervals.

Figure 3:
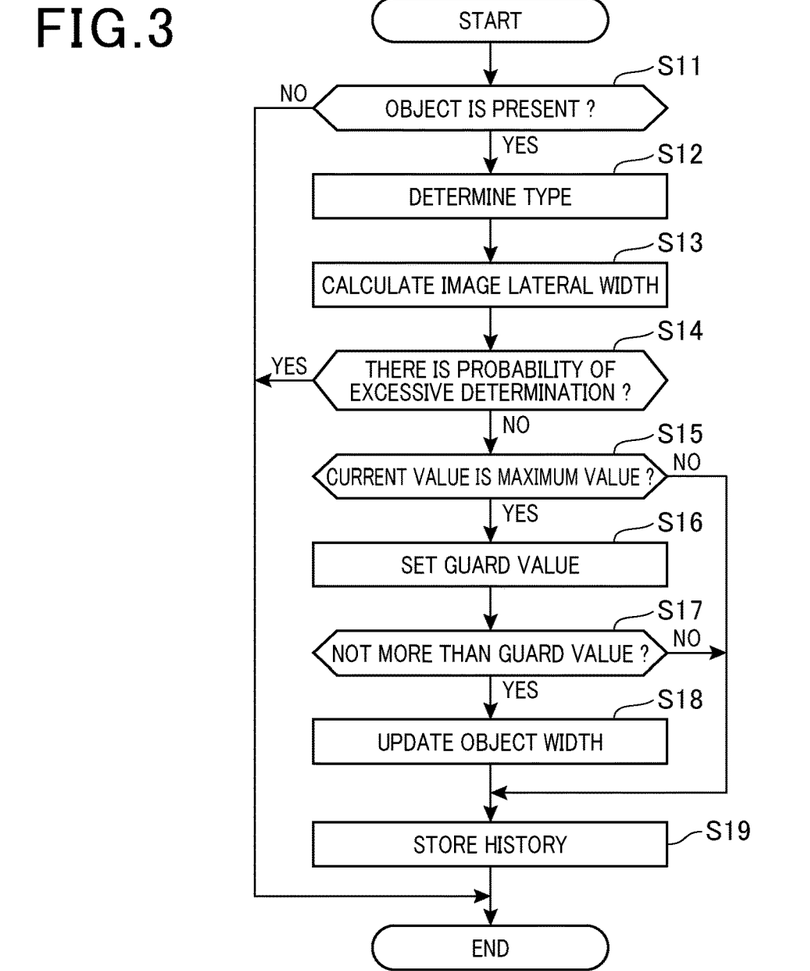
FIG. 3 is a flow chart showing a procedure for determining a lateral width of an object.

The following will describe, with reference to a flow chart shown in FIG. 3, a process for determining a lateral width performed by the ECU 10. The process is repeatedly performed by the ECU 10 at predetermined intervals.

First, in step S11, it is determined whether an object is present on the basis of an image of an area ahead of the own vehicle captured by the imaging unit 21. If an affirmative determination YES is made in step S11, the process proceeds to step S12, and the type of the object is determined. At this point, the dictionary information for object identification is used to determine whether the object is an automobile, a two-wheeled vehicle, a pedestrian, or the like.

Subsequently, in step S13, an image lateral width of the object is calculated on the basis of the image captured by the imaging apparatus 21 and the dictionary information. At this point, the dictionary information for each type of object is used to compare feature points of the object to the dictionary information. Thus, end points at both ends of the object are obtained, and the image lateral width is calculated on the basis of the end points.

Subsequently, in step S14, it is determined whether it is a situation where the object is recognized to have a lateral width greater than the actual lateral width of the object, that is, a situation where overstatement determination may be made. Specifically, it is determined that it is the situation where the object is recognized to have a lateral width greater than the actual lateral width, when one of the following situations occurs.

(1) The object is an automobile, and a rear lamp (e.g., brake lamp) of the automobile is turned on.
(2) A traveling road is a curved road.
(3) The object is located at a predetermined distance or more away from the own vehicle.
(4) The object has been subjected to wide-angle photography by the imaging unit 21.
(5) A temporary failure has occurred in acquisition of image data, and an image extrapolation process has been performed.

If an affirmative determination YES is made in step S14, step S15 and subsequent steps in FIG. 3 are not performed, and the present process ends. If a negative determination NO is made in step S14, the process proceeds to step S15.

In step S15, it is determined whether a current value of the image lateral width is the maximum value in comparison to a calculation history of the image lateral width. If the current value of the image lateral width is not the maximum value, the process proceeds to step S19, and the current value of the image lateral width is stored in the memory as the calculation history. The calculation history is a history in which all values of the image lateral width obtained after detection of the object has started are stored in time series. As the calculation history, a lateral width average value which is a value obtained by averaging values of the image lateral width until the current time point and the maximum value of the image lateral width until the current time point may be stored.

If the current value of the image lateral width is the maximum value, the process proceeds to step S16, and a guard value for updating the object width is set on the basis of the calculation history. The guard value is defined as a condition for updating the lateral width of the object. In this case, the average value of the image lateral width until the current time point is used as the calculation history, and the guard value is set to be a value obtained by adding a predetermined value α to the average value. The predetermined value α may be variably set depending on the average value of the image lateral width. For example, the predetermined value α is set to be smaller as the average value of the image lateral width is greater.

Figure 4:
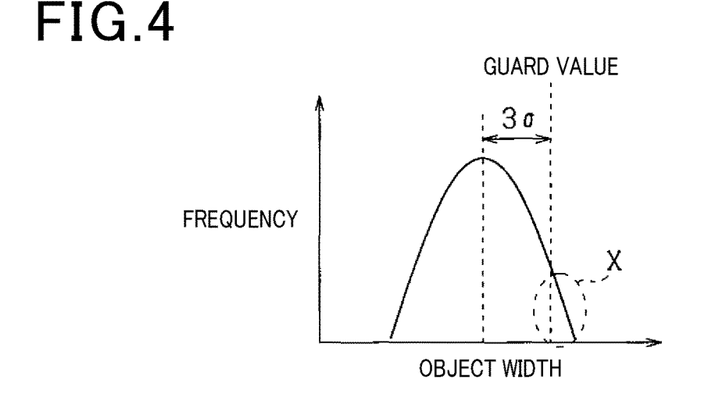
FIG. 4 is a view showing calculation of a guard value.

The guard value can be set by using distribution of values of the image lateral width until the current time point. That is, as shown in FIG. 4, the guard value is set to be a value obtained by adding 3σ (σ=standard deviation) to the average value of the image lateral width. Alternatively, the guard value can be set to be a value obtained by adding α to the average value of the image lateral width.

Furthermore, as a process for setting the guard value, the guard value can be set on the basis of the type of the object. In such a case, the guard value is set by assuming that the lateral width is difficult to recognize depending on the type of the object. For example, when the object is a bicycle and a moving speed in the lateral direction orthogonal to the direction of travel of the own vehicle is relatively high (when the lateral speed is not less than a predetermined speed), the guard value is set to be a smaller value so that the condition for updating the lateral width becomes stricter.

Subsequently, in step S17, it is determined whether the current value of the image lateral width is not more than the guard value. If an affirmative determination YES is made in step S17, the process proceeds to step S18, and the lateral width of the object is updated by setting the current value of the image lateral width as the lateral width of the object. In short, by performing steps S15 to S18, if the current value of the image lateral width is the maximum value in comparison to the calculation history and the current value of the image lateral width is not more than the guard value, the lateral width of the object is updated by setting the current value as the lateral width of the object. For example, in FIG. 4, the lateral width is not updated for distribution X of values exceeding the guard value.

Subsequently, in step S19, the current value of the image lateral width is stored in the memory as the calculation history. If a negative determination NO is made in step S15 or S17, the lateral width of the object is not updated, but the calculation history is stored (updated).

The present embodiment described above in detail provides the following beneficial effects.

According to the above configuration, when the image lateral width is calculated on the basis of the image captured by the imaging apparatus 21 and the dictionary information, it is determined whether the current value of the image lateral width is the maximum value in comparison to the calculation history of the image lateral width, and the object width is updated by setting, as the object width, the maximum value in the calculation history of the image lateral width. In this case, since the object width is updated by setting, as the object width, the maximum value in the calculation history of the image lateral width, even when the image lateral width of the object is erroneously calculated to be smaller than the actual lateral width of the object, erroneous recognition in which the calculated value is directly recognized as the object width is suppressed. This makes it possible to properly recognize the lateral width of the object.

The above proper recognition of the lateral width of the object makes it possible to correctly obtain a lap ratio of the front object with respect to the own vehicle. This makes it possible to properly perform the collision avoidance control. When a movement path of the object is calculated on the basis of a lateral position (left and right lateral position) obtained by taking into account the lateral width of the object, accuracy of the movement path is increased. This makes it possible to highly accurately perform the collision avoidance control for the object to be detected.

When the lateral width of the object is calculated by using the captured image and the dictionary information, the lateral width may be calculated to be smaller than the actual lateral width of the object. However, the lateral width of the object may be calculated to be greater than the actual lateral width. In such a case, if the calculation history of the image lateral width includes the lateral width greater than the actual lateral width, accuracy in calculation of the lateral width of the object is adversely influenced. In this regard, according to the above configuration, when the situation is detected where the object is recognized to have a lateral width greater than the actual lateral width of the object, the image lateral width calculated in the situation is not included in the calculation history, and the comparison between the current value and the maximum value is not performed. This makes it possible to suppress deterioration in accuracy of calculation in the configuration in which the lateral width of the object is calculated by using the maximum value in the calculation history.

When the rear lamp of the front vehicle is turned on, an edge portion in the captured image may be expanded, and this may cause the image lateral width to be recognized to be greater than the actual lateral width. In this regard, since the image lateral width when the rear lamp of the front vehicle is turned on is not included in the calculation history, it is possible to suppress deterioration in accuracy of calculation of the lateral width of the vehicle. In particular, in a dark environment such as at nighttime, due to the rear lamp which is turned on, the lateral width of the vehicle is highly likely to be recognized to be greater than the actual lateral width. Accordingly, on condition that it is a dark environment, it is preferable not to include the image lateral width in the calculation history when the rear lamp of the front vehicle is turned on.

In addition, the image lateral width is not included in the calculation history when the traveling road is the curved road, when the object is located at a predetermined distance or more away from the own vehicle, when the object has been subjected to wide-angle photography by the imaging apparatus 21, or when an image extrapolation process has been performed. This also makes it possible to suppress deterioration in accuracy of calculation of the lateral width of the object.

A guard value is set on the basis of the calculation history of the image lateral width, and when the current value of the image lateral width is the maximum value in comparison to the calculation history of the image lateral width and the current value of the image lateral width is not more than the guard value, the object width is updated by setting the current value as the object width. In this case, a trend in size of the image lateral width is obtained from the calculation history, and by taking into account the trend, the lateral width is updated by setting the maximum value as the lateral width. This makes it possible to prevent updating in which the lateral width is updated by setting, as the lateral width, an abnormal value which is different from the trend in the calculation history.

The object which is detected by using the captured image includes an automobile, a two-wheeled vehicle, and a pedestrian, and the lateral width may be difficult to recognize depending on the type of the object. In this regard, the guard value is set on the basis of the type of the object. This makes it possible to prevent a problem in which updating of the maximum value rather causes deterioration in accuracy of recognition of the lateral width.

At the rear of the front vehicle, a different uneven structure or a lamp unit is mounted for each vehicle model, and thus when the lateral width is calculated, the lateral width may be recognized to be narrower than the actual lateral width. In this regard, the above configuration makes it possible to properly recognize the lateral width of the rear of the vehicle.

Other Embodiments

The above embodiment can be modified, for example, as described below.

The object detection apparatus may be configured such that when it is determined that the object has been recognized to have a lateral width greater than the actual lateral width of the object, a predetermined width reduction process for reducing the image lateral width calculated in the situation is performed, and the image lateral width obtained after the reduction of the image lateral width is included in the calculation history. Specifically, the ECU 10 performs a process for determining the lateral width shown in FIG. 5. This process is a process obtained by partially changing the process in FIG. 3, and descriptions of steps given the same step numbers as those in FIG. 3 are omitted.

Figure 5:
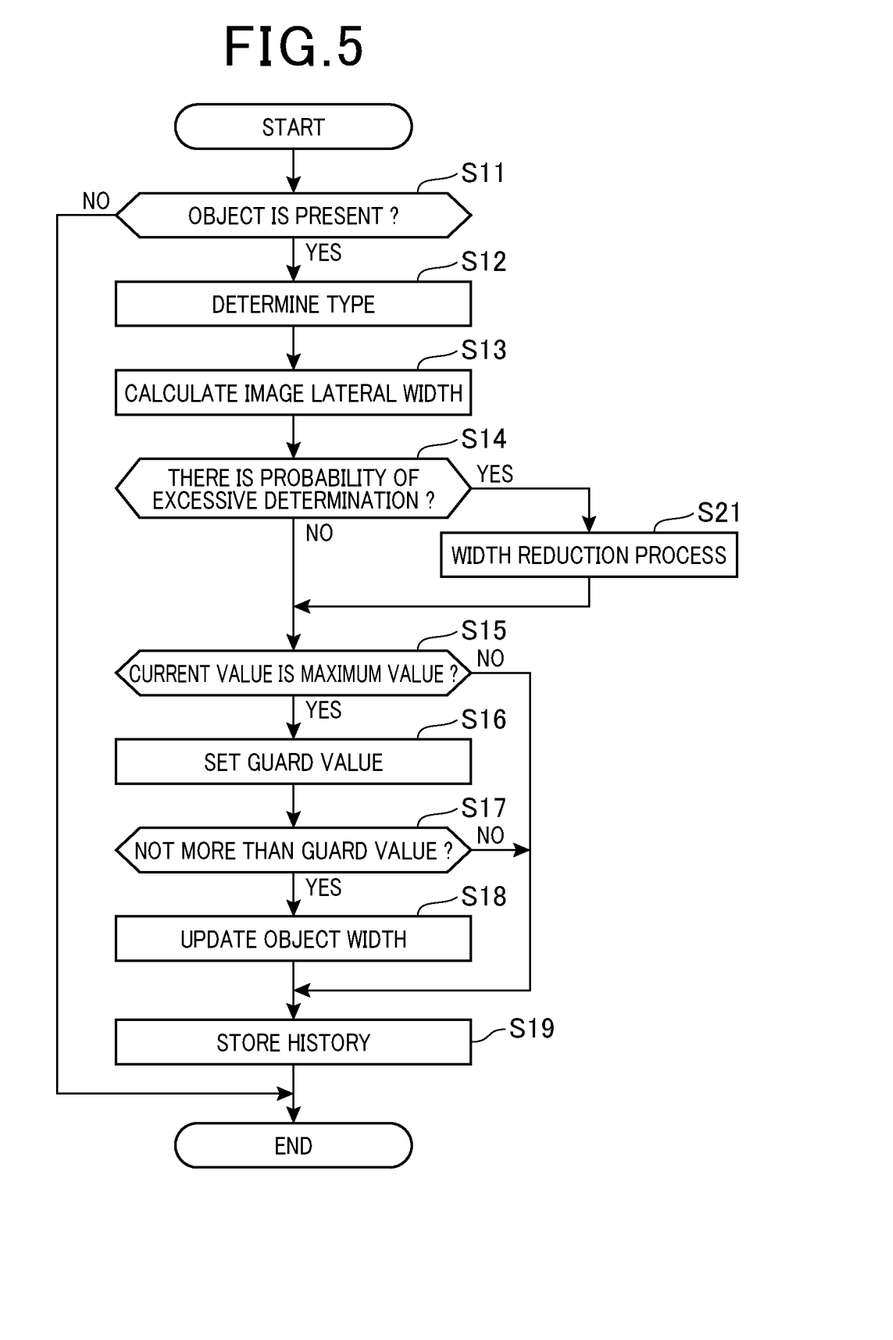
FIG. 5 is a flow chart showing a procedure for determining a lateral width of an object in another example.

In FIG. 5, when it is determined that an object is present ahead of the own vehicle and it is determined that it is a situation where the object is recognized to have a lateral width greater than the actual lateral width of the object (YES in both steps S11 and S14), the process proceeds to step S21. In step S21, the width reduction process is performed regarding the image lateral width calculated in step S13. The width reduction process is a process in which, in the situation where the object is recognized to have a lateral width greater than the actual lateral width of the object, the lateral width is corrected so that the lateral width is reduced by an excessive amount. For example, the corrected image lateral width is calculated by subtracting a predetermined correction value from the image lateral width. Alternatively, the corrected image lateral width may be calculated by multiplying the image lateral width by a reduction correction coefficient. The correction value or the correction coefficient may be set according to the factors (the above factors (1) to (5)) for the overstatement determination.

Subsequently, in step S15 and subsequent steps, a process for determining the maximum value, a process for updating the lateral width, and the like are performed. In this case, unlike in FIG. 3, even in the situation where the object is recognized to have a lateral width greater than the actual lateral width of the object, the image lateral width obtained after the width reduction process is stored in the memory as the calculation history.

According to the above configuration, in the situation where the object is recognized to have a lateral width greater than the actual lateral width of the object, it is possible to obtain the image lateral width by taking this situation into account. This makes it possible to suppress deterioration in accuracy of calculation of the lateral width of the object.

The object detection apparatus may be configured such that, in step S16 in FIG. 3, it is determined whether it is the situation where the object is recognized to have a lateral width smaller than the actual lateral width of the object, and when it is determined that it is the situation where the object is recognized to have a lateral width smaller than the actual lateral width of the object, the guard value is set to be greater than that when it is determined that it is not the situation.

At nighttime, in particular, when the object itself emits no light at nighttime, ends of the object in the width direction of the object become difficult to recognize, and thus the lateral width of the object becomes more likely to be calculated to be smaller than the actual lateral width of the object. For example, when a bicycle is traveling ahead of the own vehicle at nighttime, the lateral width of the object is highly likely to be recognized to be smaller than the actual lateral width of the object. In this regard, in the situation where the lateral width of the object is likely to be calculated to be smaller than the actual lateral width of the object, the guard value is set to be a greater value so that the maximum value becomes more likely to be updated. This makes it possible to properly recognize the lateral width of the object.

The object detection apparatus may be configured such that when it is determined that the object is a two-wheeled vehicle, the condition for updating the lateral width of the object by setting, as the lateral width of the object, the image lateral width having the maximum value is set to be stricter than that when it is determined that the object is an automobile. Specifically, in step S16 in FIG. 3, when the object is a two-wheeled vehicle (bicycle), the guard value is set to be a smaller value so that the condition for updating the lateral width becomes stricter, that is, the lateral width becomes less likely to be updated than that when the object is an automobile. In this case, it is preferable to set a difference (predetermined value α) between the guard value and the average value of the image lateral width until the current time point so that when the object is a two-wheeled vehicle, the difference is smaller than that when the object is an automobile.

In comparison between a case where the object to be detected is a two-wheeled vehicle and a case where the object to be detected is an automobile, when the object is a two-wheeled vehicle, the lateral width of the object is more difficult to recognize than that when the object is an automobile. In particular, the difficulty is presumably significant when a moving speed in the lateral direction is high. In this regard, when it is determined that the object is a two-wheeled vehicle, the condition for updating the object width by setting, as the object width, the image lateral width having the maximum value is set to be stricter than that when it is determined that the object is an automobile. Accordingly, when a two-wheeled vehicle is detected, it is possible to prevent updating in which the lateral width of the two-wheeled vehicle is erroneously updated to a greater value.

The object detection apparatus may be configured such that when the front vehicle is an oncoming vehicle which is traveling in the direction opposite to the direction of travel of the own vehicle, the lateral width of the oncoming vehicle is calculated. In such a case, the ECU 10 calculates an image lateral width on the basis of a pattern of the front of the front vehicle, and the lateral width of the oncoming vehicle is calculated on the basis of the image lateral width.

The object detection apparatus may be configured such that the image lateral width is corrected on the basis of the distance between the vehicle and the front object. It is preferable to correct the image lateral width on the basis of the distance between the front object and the own vehicle acquired by the radar sensor 22.

The object detection apparatus may be configured such that the lateral width of the object is calculated by simultaneously calculating the maximum value, an average value, an instantaneous value of the image lateral width and combining the calculated values according to a scene. For example, it is preferable to calculate the lateral width of the object in the following manner. That is, when the number of acquisitions of the image lateral width is small, the average value is used, and after the number of acquisitions has increased, the maximum value is weighted. When the object to be detected moves greatly, tracking of the object may be erroneously performed or a direction of the object may be changed. Thus, in such a case, for example, it is preferable to increase the weight to the instantaneous value.

The object detection apparatus may be configured by the ECU 10 and the imaging unit 21 (in particular, a control section of the imaging unit 21).

The present disclosure is described on the basis of the embodiments, but the present disclosure is considered to be not limited to the embodiments or the configurations. The present disclosure encompasses various modified examples and variations in an equivalent range. In addition, the scope or the range of thought of the present disclosure encompasses various combinations or forms and other combinations or forms including only one element, one or more elements, or one or less elements of those.

The invention claimed is:

1. An object detection apparatus which detects an object which is present in a surrounding area on the basis of an image captured by an imaging means, the object detection apparatus comprising:

a lateral width calculation section which calculates, as an image lateral width, a size of the object in a lateral direction relative to an imaging axis direction of the imaging means on the basis of the image and dictionary information which is prepared in advance and is used for object identification;

a maximum value determination section which determines whether a current value of the image lateral width calculated by the lateral width calculation section is a maximum value in comparison to a calculation history of the image lateral width;

a lateral width update section which updates an object width which is a lateral width of the object by setting, as the object width, the image lateral width having the maximum value in the calculation history; and an overstatement situation determination section which determines whether it is a situation where the object is recognized to have a lateral width greater than an actual lateral width of the object which is a lateral width that the object actually has, wherein when the overstatement situation determination section determines that it is the situation where the object is recognized to have a lateral width greater than the actual lateral width of the object, the image lateral width calculated in the situation is not included in the calculation history.

2. The object detection apparatus according to claim 1, comprising an overstatement situation determination section which determines whether an imaging situation by the imaging means is a situation where the object is recognized to have a lateral width greater than an actual lateral width of the object which is a lateral width that the object actually has, wherein when the overstatement situation determination section determines that it is the situation where the object is recognized to have a lateral width greater than the actual lateral width of the object, a predetermined width reduction process for reducing the image lateral width calculated in the situation being performed, and the image lateral width obtained after the predetermined width reduction process being included in the calculation history.

3. The object detection apparatus according to claim 1, wherein when the object is a vehicle and a lamp at a front or rear of the vehicle is turned on, the overstatement situation determination section determines that it is the situation where the object is recognized to have a lateral width greater than the actual lateral width of the object.

4. The object detection apparatus according to claim 1, comprising a guard setting section which sets, on the basis of the calculation history, a guard value for updating the object width, wherein when the current value is the maximum value in comparison to the calculation history and the current value is not more than the guard value, the lateral width update section updates the object width by setting the current value as the object width.

5. The object detection apparatus according to claim 4, comprising a type determination section which determines a type of the object, wherein the guard setting section sets the guard value on the basis of the type of the object.

6. The object detection apparatus according to claim 4, comprising an understatement situation determination section which determines whether an imaging situation by the imaging means is a situation where the object is recognized to have a lateral width smaller than an actual lateral width of the object which is a lateral width that the object actually has, wherein when the understatement situation determination section determines that it is the situation where the object is recognized to have a lateral width smaller than the actual lateral width of the object, the guard setting section sets the guard value to be greater than that when the understatement situation determination section determines that it is not the situation.

7. The object detection apparatus according to claim 1, wherein when the imaging means captures an image of a front or a rear of a front vehicle which is traveling ahead, the lateral width calculation section calculates an image lateral width of the front or the rear of the front vehicle on the basis of the image of the front or the rear of the front vehicle and dictionary information which is prepared in advance and is related to a vehicle pattern, the maximum value determination section determines whether a current value of the image lateral width of the front or the rear of the front vehicle is a maximum value in a calculation history of the image lateral width; and the lateral width update section updates a lateral width of the front vehicle by setting, as the lateral width of the front vehicle, the image lateral width having the maximum value in the calculation history.

8. The object detection apparatus according to claim 1, comprising a type determination section which determines a type of the object including a two-wheeled vehicle and an automobile, wherein when the type determination section determines that the object is a two-wheeled vehicle, the lateral width update section sets an update condition to be stricter than that when the type determination section determines that the object is an automobile, the update condition being a condition for updating the object width by setting, as the object width, the image lateral width having the maximum value.

* * * * *